UNITED STATES PATENT OFFICE.

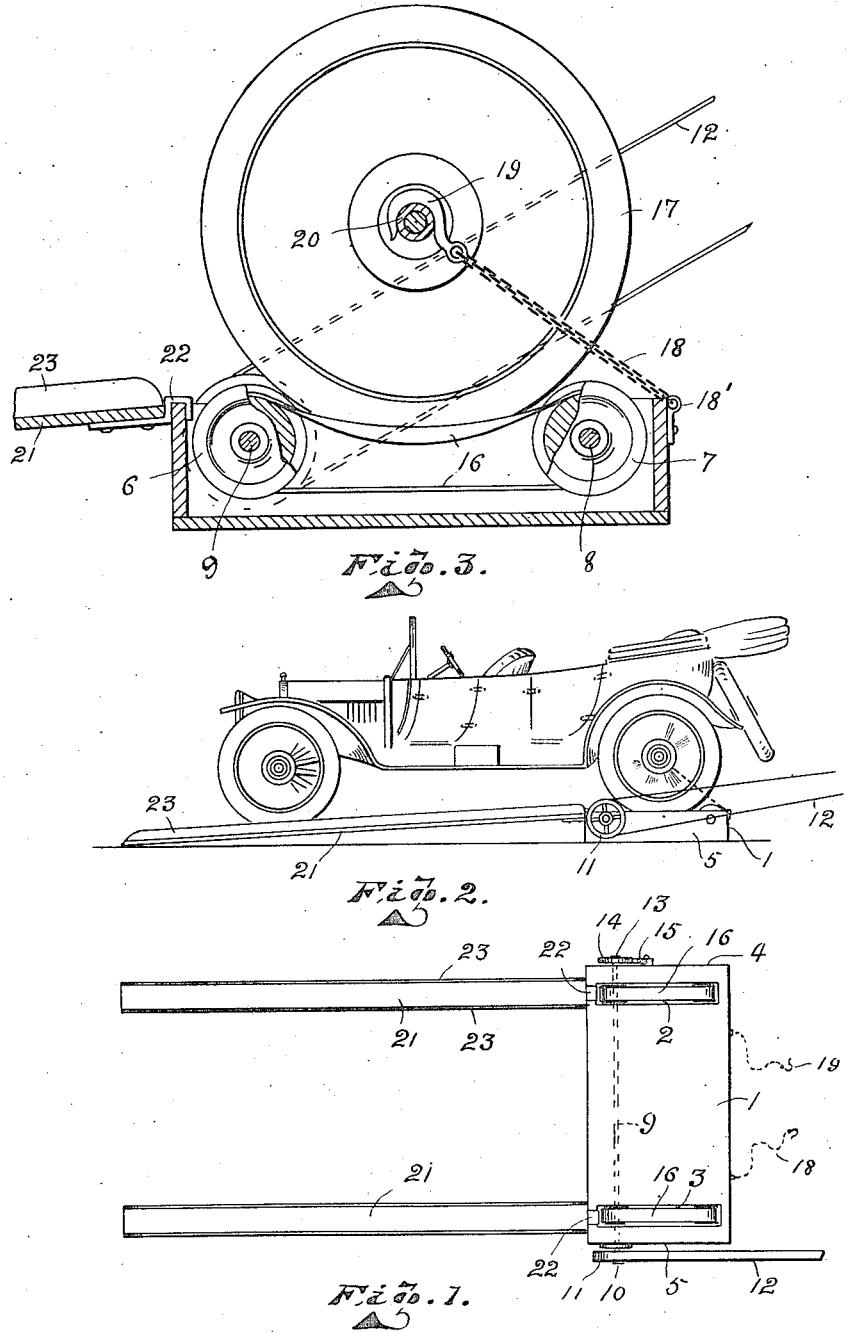

BARTO E. DOTY, OF TINTAH, MINNESOTA.

POWER-TRANSMISSION DEVICE.

1,127,208.  Specification of Letters Patent.  Patented Feb. 2, 1915.

Application filed March 16, 1914. Serial No. 825,119.

*To all whom it may concern:*

Be it known that I, BARTO E. DOTY, a citizen of the United States, residing at Tintah, in the county of Traverse and State of Minnesota, have invented certain new and useful Improvements in Power-Transmission Devices, of which the following is a specification, reference being had therein to the accompanying drawing.

My invention relates to improvements in power transmission devices.

The object of my invention is to provide means for transmitting power from a self-propelled vehicle, such as an automobile, and providing means whereby the automobile may be readily placed in position to drive the device, as will be hereinafter more fully described.

Another object of my invention is to provide a simple, cheap and effective power transmission device having certain details of structure and operation hereinafter more fully set forth.

In the accompanying drawings Figure 1 is a top plan view of my improved power transmission device. Fig. 2 is a side elevation of Fig. 1, showing an automobile in position to operate the same. Fig. 3 is an enlarged vertical sectional view through one of the tread wells, illustrating the means for transmitting power and also showing means for holding the automobile thereon.

Referring now to the drawings, 1 represents a rectangular-shaped box-like structure of a width greater than the tread of the ordinary automobile and having adjacent its ends 4 and 5 the two wells 2 and 3 in the upper end thereof. Within each well of the rectangular-shaped box-like member are mounted two flanged pulleys or rollers 6 and 7. The two rear pulleys 7 are mounted on stub shafts 8, in any desired manner and said shafts are free to rotate whereby the pulleys 7 are idlers. The forward pulleys 6, mounted in the wells 2 and 3, are rigidly carried by a horizontal shaft 9, which extends across the rectangular-shaped box-like member 1 and has one end 10 extending beyond the same and provided with a suitable pulley 11, over which the chain passes and by means of this chain or belt 12 power is transmitted to the desired point. The opposite end 13 of the shaft 9 is provided with a ratchet wheel 14, rigidly locked thereon and adapted to be engaged by a pawl 15, the object of which will be hereinafter more fully described. Passing around each pair of pulleys 6 and 7, is an endless flexible band or belt 16, which forms the tread for the wheels 17 of the automobile, as clearly shown in Fig. 3, of the drawings, and whereby the shaft 9 is driven by the rotation of the wheels 17 to transmit power to the belt or chain 12, as hereinafter described.

In the operation of the device, it will be understood that any abnormal friction upon the belt 12, caused by an over-load on the machine or device being driven, the wheels of the automobile would run forward upon the belt and out of the wells, as will be readily understood. In order to prevent this, I provide a series of chains 18 secured at the rear ends to eyes 18' carried by the rear wall of the rectangular-shaped box-like member and are provided at their forward ends with hooks 19 adapted to pass over the rear axle housing 20 to prevent this forward motion of the machine, as will be readily understood. In order to enable the wheels of the automobile to enter the wells, I provide running boards 21 having at their rear ends hooks 22, adapted to hook over the forward wall of the rectangular-shaped box-like member and the opposite end of the running boards resting upon the ground, as clearly shown in Fig. 2 of the drawings. These running boards are provided with side-boards 23 to prevent the wheels of the automobile from running off when traveling upwardly thereon. These running boards are of a length greater than the wheel base of the automobile, so that when the rear wheels of the automobile are upon the endless belt 16, the forward wheels are up upon the running board, so as to bring the automobile into approximately a horizontal position and thus leveling up the engine so as to obtain the best running results. It will also be seen that the flanges of the pulleys 6 and 7 extend slightly above the top surface of the rectangular-shaped box-like member so that the box-like member can be turned up-side-down and can be rolled from place to place upon the rolls or pulleys 6 and 7. When the automobile is in the position shown in the drawings and it is desired to cause it to travel forward out of the device, all it is necessary to do is to throw the pawl 15 into engagement with the ratchet wheel 14, which locks the shaft 9 against rotation and which holds the belts 16 against movement and the wheels of the automobile will then travel forward upon the belt out of the wells and travel down the running-boards.

Having thus described my invention, what I claim and desire to secure by Letters Patent is:—

A device of the character described, comprising a rectangular-shaped box, pulleys mounted within the box and spaced apart, endless belts surrounding the pulleys and adapted to support vehicle wheels intermediate the pulleys, a pulley carried by the shaft of one set of pulleys for transmitting power, a ratchet carried by the same shaft of the pulleys, a pawl carried by the box for engaging the ratchet for locking the shaft to stop the movement of the endless belts to cause the vehicle to ride forward upon the belt out of the box, running-boards having hooks at their rear ends adapted to hook over the forward wall of the box and having side guards and of a length to support the forward wheels of the vehicle when the rear wheels are supported by the endless belts.

In testimony whereof I hereunto affix my signature in the presence of two witnesses.

BARTO E. DOTY.

Witnesses:
V. G. NELSON,
THOS. KEARNEY.